Figures 9, 10:
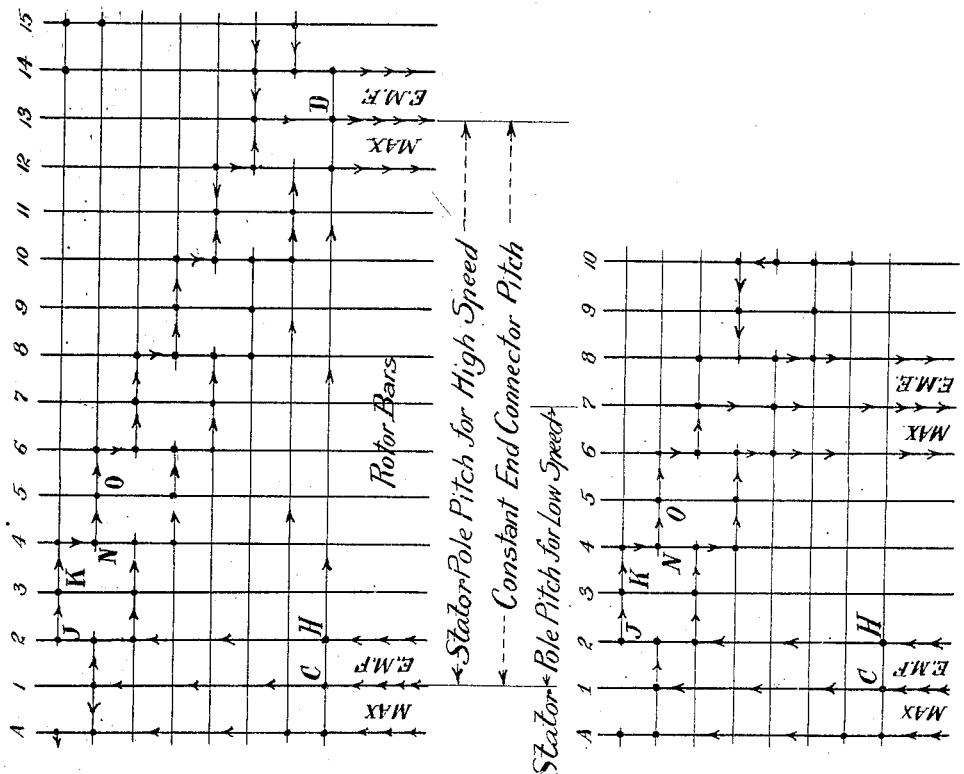

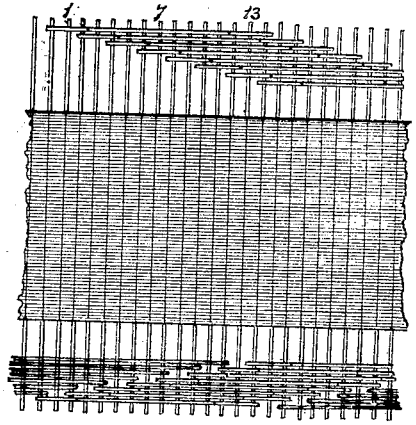
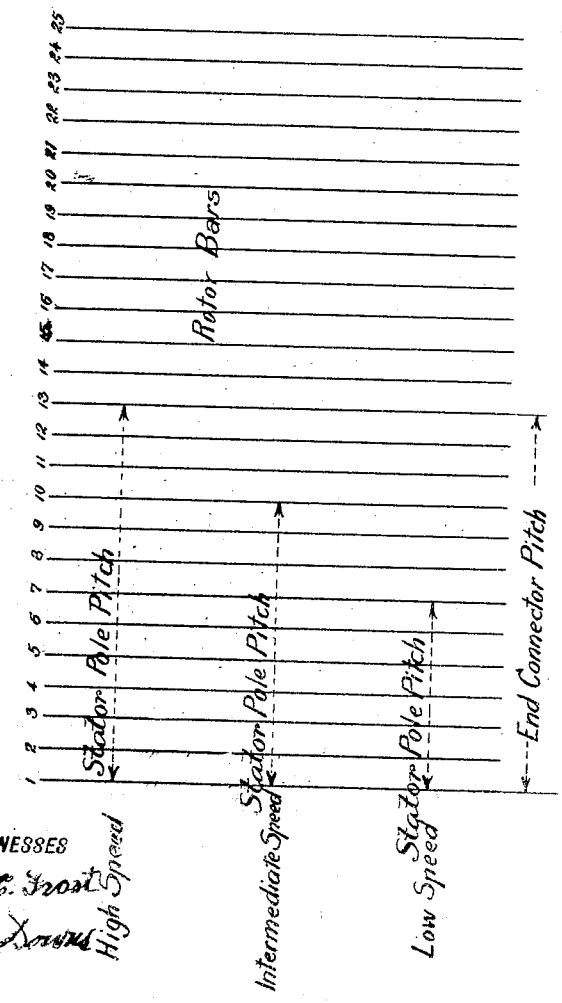
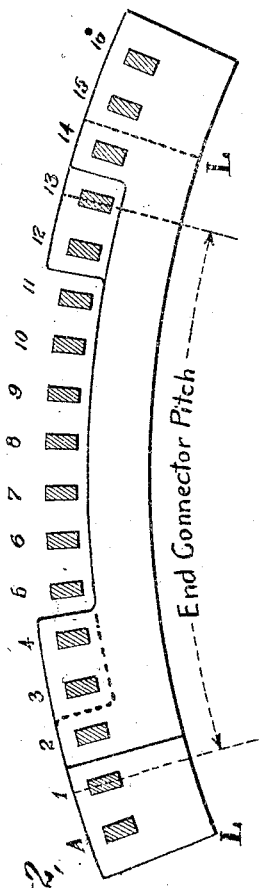

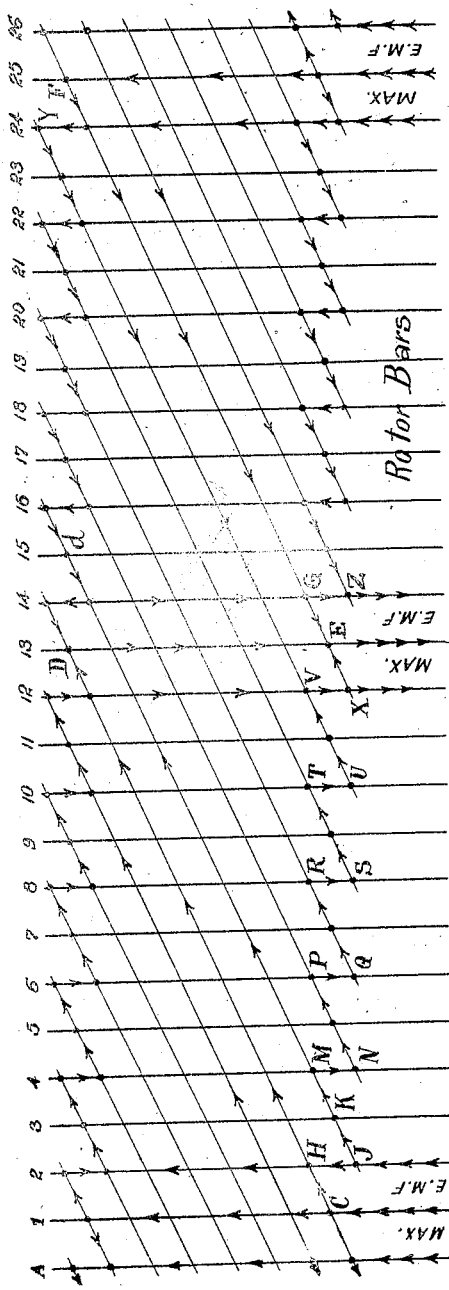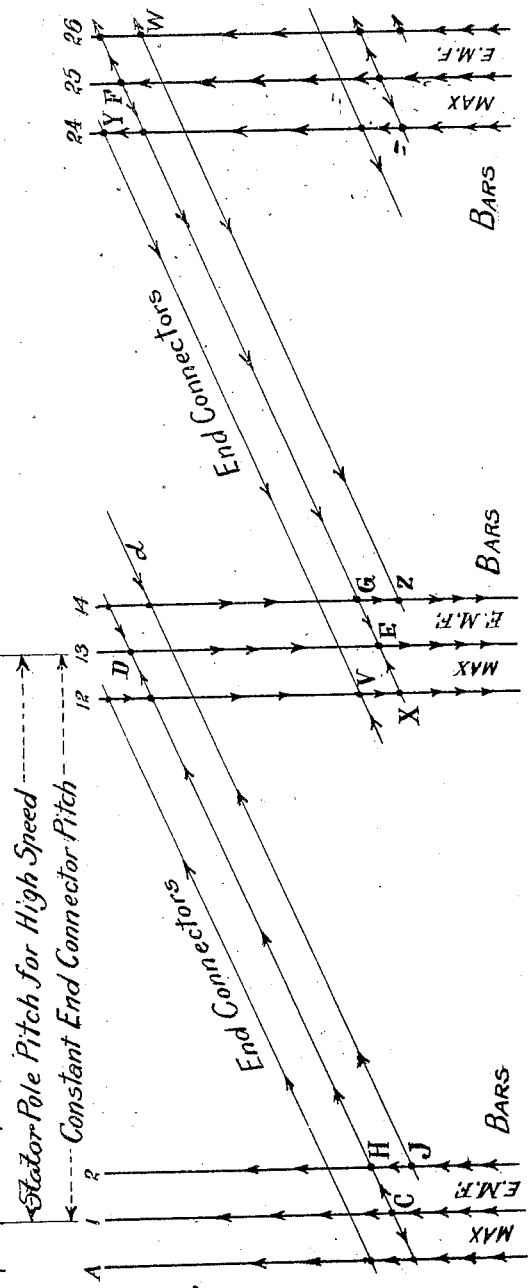
Fig. 4.
Fig. 4a.

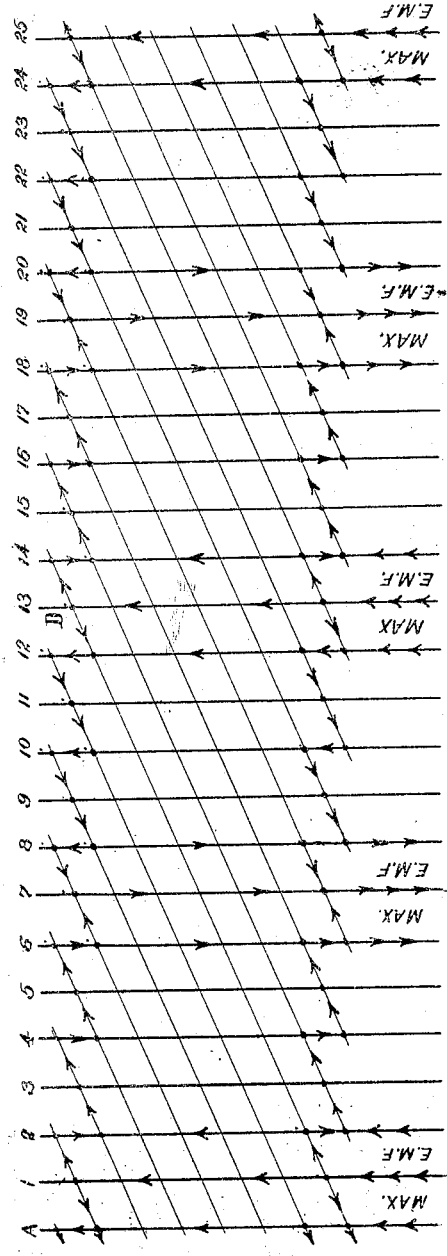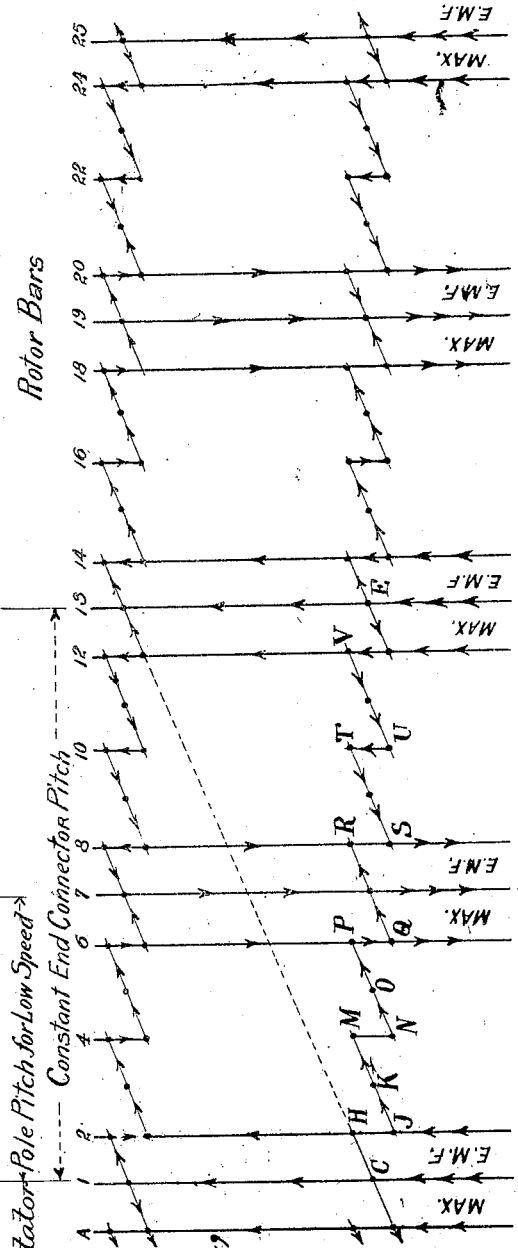

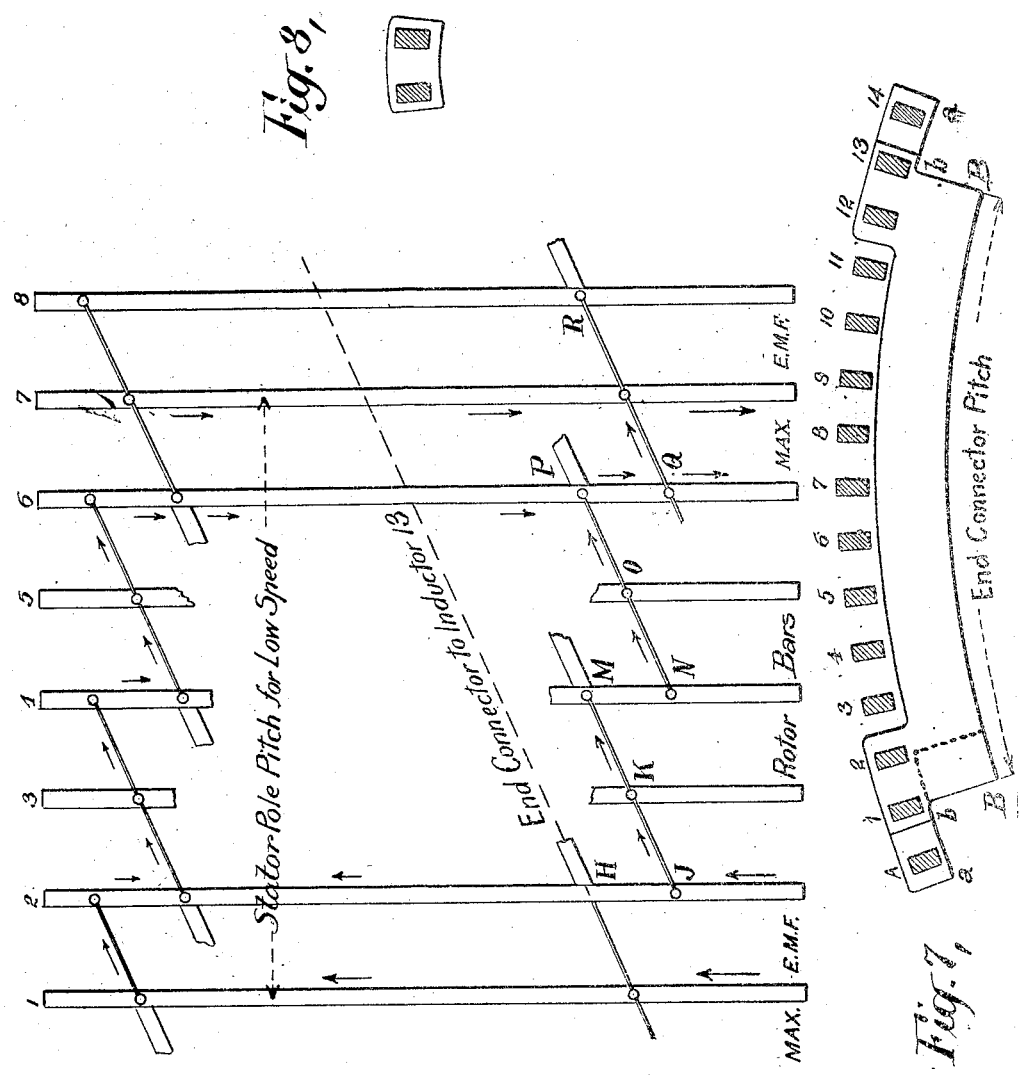

A. W. FORBES.
INDUCTION MOTOR.
APPLICATION FILED FEB. 21, 1913.

1,183,548.

Patented May 16, 1916.
7 SHEETS—SHEET 5.

WITNESSES
Alfred E. Frost
Ira G. Downs

INVENTOR
Allan W. Forbes
BY
Francis B. Crock
ATTORNEY

A. W. FORBES.
INDUCTION MOTOR.
APPLICATION FILED FEB. 21, 1913.

1,183,548.

Patented May 16, 1916.
7 SHEETS—SHEET 6.

WITNESSES
Alfred E. Frost
Ira J. Downs

INVENTOR
Allan W. Forbes
BY
Francis B. Crocker
ATTORNEY

A. W. FORBES.
INDUCTION MOTOR.
APPLICATION FILED FEB. 21, 1913.

1,183,548.

Patented May 16, 1916.
7 SHEETS—SHEET 7.

WITNESSES
Alfred E. Frost
Ira G. Downs

INVENTOR
Allan W. Forbes
BY
Francis B. Crocker
ATTORNEY

UNITED STATES PATENT OFFICE.

ALLAN W. FORBES, OF WORCESTER, MASSACHUSETTS, ASSIGNOR TO CROCKER-WHEELER COMPANY, OF AMPERE, NEW JERSEY, A CORPORATION OF NEW JERSEY.

INDUCTION-MOTOR.

1,183,548.   Specification of Letters Patent.   Patented May 16, 1916.

Application filed February 21, 1913. Serial No. 749,813.

*To all whom it may concern:*

Be it known that I, ALLAN W. FORBES, a citizen of the United States, and resident of Worcester, in the county of Worcester and State of Massachusetts, have invented certain new and useful Improvements in Induction-Motors, of which the following is a specification.

My invention relates to alternating current induction motors, either single-phase or polyphase.

The object of my invention is to construct such motors so that they will start and operate at low speeds as well as high speeds in a satisfactory manner.

In carrying out my invention I change the number of poles produced by the stator or primary winding of the motor in order to obtain different speeds and I construct the system of conductors that form the secondary circuit so that its resistance with respect to the currents induced in it is relatively greater for the lower speed or speeds.

It is well known that the squirrel cage construction is a very desirable form of rotor for induction motors because of its mechanical as well as electrical simplicity and sturdiness. It comprises an iron core carrying a number of inductors or longitudinal conducting bars connected together at both ends to obtain a closed secondary circuit of low resistance. This low resistance is an advantageous condition when the rotor is operating at or near full speed. On the other hand, for starting an induction motor or for running it at low speed or speeds less than those approximating the maximum, it is usually desirable that the secondary resistance should be relatively greater than for high speed operation. Heretofore this increased resistance has not been readily obtainable without sacrificing the simplicity and freedom from moving electrical contacts which constitute special merits of the squirrel cage rotor. One method for obtaining low speeds or multispeeds consists in altering the pole pitch or distance between the magnetic poles formed by the alternating current or currents in the primary winding of the stator. For example, an eight-pole machine that runs nearly 900 R. P. M. with a frequency of 60, will run at about one-half that speed or about 450 R. P. M. if the primary winding is so arranged and connected that it forms sixteen poles instead of eight, at the same time the pole pitch of course becomes one-half as great as before. With a rotor of the ordinary squirrel cage type, the secondary resistance is actually less when it is starting or running at lower speed with the reduced pole pitch, because the paths of the induced secondary currents are shorter with the smaller pole pitch.

By means of the construction which I have invented the secondary resistance of an induction motor may be designed to be as high as desired for starting or operating at low speeds; at the same time said secondary resistance may be designed to be as low as desired when the machine is running at or near its full speed. These advantageous conditions are obtained without requiring any moving parts or contacts in or on the rotor. To accomplish these results I construct and combine the conducting bars and end connections which form the secondary circuit of an induction motor, so that the induced currents are caused to pursue high resistance paths for starting or for low speeds and are afforded low resistance paths for high speeds.

The accompanying drawings set forth the nature of my invention and illustrate some of the forms of construction that may be employed in practising it.

Figure 11:
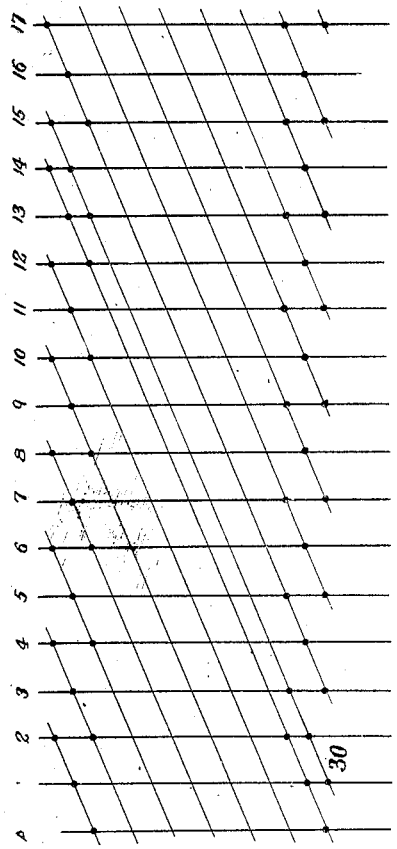
Figure 12:
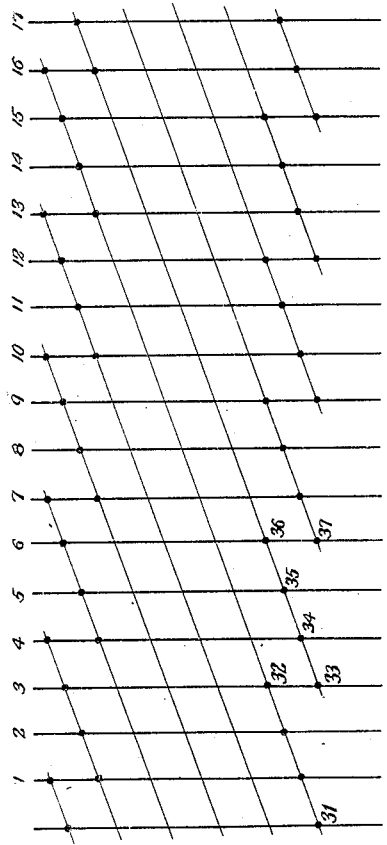
Figure 13:
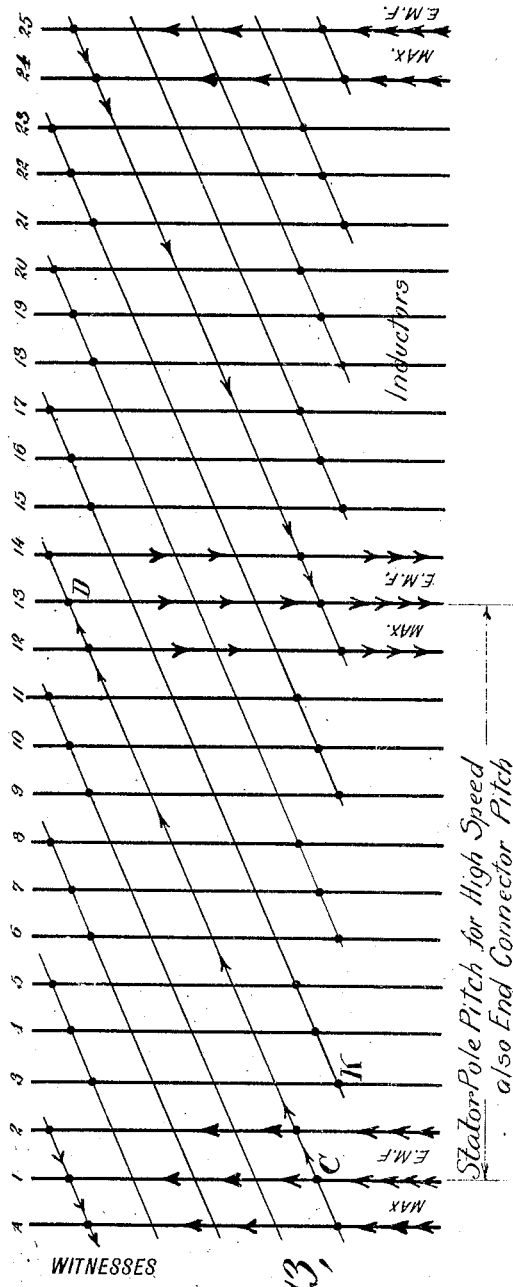

Figure 1 represents a portion of the rotor bars of an induction motor laid out in a plane to show the relative pole pitch for high, intermediate and low speeds, also the end connector pitch. Fig. 2 shows a form of end connector by which the rotor bars may be joined to form a secondary winding according to my invention. Fig. 3 represents a portion of the surface of a rotor, including the core, rotor bars and end connectors arranged in accordance with my invention. Fig. 4 shows one of my arrangements of bars and end connectors also the paths of the currents at one end of the rotor and Fig. 4ᵃ shows the active bars and end connectors taken from Fig. 4 for the sake of clearness, the pole pitch being that corresponding to high speed. Figs. 5 and 5ᵃ illustrate the same bars and end connectors, also the paths of the currents, with a pole pitch corresponding to low speed. Fig. 6 shows a construction of my end connectors by which the resistance of the secondary circuit may be made as high as desired for starting or for low speeds. Fig. 7 illustrates a form of my end connector adapted to be used in the winding represented in Fig. 6. In Fig. 8 is shown a small auxiliary end connector adapted to produce the same result of higher resistance for low speeds. Figs. 9 and 10 represent a modified form of my construction of bars and end connectors, corresponding to that shown in Figs. 4, 4ª, 5, and 5ª, but having connectors perpendicular to the bars instead of oblique thereto. Figs. 11 and 12 also represent modified arrangements of bars and end connectors according to my invention. Fig. 13 shows a secondary circuit of low resistance suitable for high speeds and Fig. 14 a secondary circuit of relatively higher resistance suitable for starting or low speeds.

In Fig. 1 the vertical lines marked 1 to 25 respectively, represent a portion of the inductors or longitudinal conducting bars of the rotor of an induction motor. In the ordinary squirrel cage rotor these bars are all connected together at both ends by what are called end rings or equivalent construction. For the purposes of my invention, these bars are connected in a special manner. For example bar 1 is connected by a conductor of low resistance to bar 13. Similarly bar 2 is connected to bar 14 and so on. In this case the conductor spans 12 bars, and this distance I call the end connector pitch, as shown in Fig. 1. The pole pitch or distance between adjacent poles produced by the primary winding which corresponds to high speed may be made equal or approximately equal to this end connector pitch, as also shown in Fig. 1. The pole pitch for lower speeds is less, being usually about one-half as much for one-half speed and so on, as represented.

A form of end connector that may be employed in carrying out my invention is illustrated in Fig. 2. Its length is L L and part of its outline is indicated by dotted lines because it is overlapped by the next connector the outline of which is shown in solid lines. The three inductors or bars A, 1 and 2 are connected to one end of the first connector, the other end of which connects with the bars 12, 13 and 14, as represented. The end connector pitch is its average span which is from bar 1 to bar 13, that is, twelve bars, as shown. Similarly the next connector unites the bars 2, 3 and 4 at one end to the bars 14, 15 and 16 at its other end, the average span or connector pitch being twelve bars, as before. The other bars are electrically connected in a corresponding manner by end connectors.

In Fig. 4 the bars marked A, 1, 2, etc., to 26 inclusive, are shown diagrammatically with their connections at one end of the rotor. The bar 1 is connected by the end connector C D to bar 13, as shown, the black dots at the intersection of two lines indicating electrical connection at that point. It is important to note that the end connector C D is connected at one end not only to bar 1 but also to the two adjacent bars A and 2 and at the other end it connects with bars 12 and 14 as well as bar 13. In other words, a group of three consecutive bars are connected to another group of three consecutive bars, the average distance between the two groups being called the end connector pitch which in this case spans twelve bars. The next end connector J d joins the bars 2, 3 and 4 to the bars 14, 15 and 16, the pitch being the average distance, that is from the point K where it connects with the bar 3 to the point d where it connects with the bar 15, a span of twelve bars, as before. If now the primary winding be arranged and connected to produce such a number of magnetic poles that the pole pitch or distance between them is about equal to the connector pitch, it is evident that the current induced upward in bar 1 for example, will flow directly to bar 13 and downward therein, as indicated by the arrows. The resistance in the path of this current may be made as low as desired by having the end connector C D of the proper material and cross section. With the arrangement shown in Fig. 4, the actual fact is that three bars A, 1 and 2 in which maximum current tends to be generated upward, are connected by three end conductors, (that is C D and those on either side of it) to the three bars 12, 13 and 14 in which maximum current tends to be generated downward. Hence strong currents may be readily set up in this low resistance path. At the other end of the rotor these currents flow through corresponding connectors to the bars 24, 25 and 26 in which maximum current tends to be generated upward, and so on all around the armature, the total number of bars being approximately a multiple of 12 but preferably a prime number. In order to bring out clearly the active bars and connectors with the direction of the currents therein, these are separated from the others and shown by themselves in Fig. 4ª. The currents flowing downward in the three bars 12, 13 and 14 are brought from both directions by the three end connectors C D, J d, etc., on the left and the three end connectors V Y, X F and Z W on the right. Figs. 4 and 4ª show only the bars and connectors at one end of the rotor, a corresponding arrangement being made at the other end.

In order to run the rotor at lower speed, the primary winding is so connected that the number of poles produced by it is increased and the pole pitch reduced accordingly. For example, if the pole pitch is made one-half as much as before, we have the conditions represented in Figs. 5 and 5ª.

The tendency for strong currents to flow from bar 1 to bar 13 no longer exists because the E. M. F. is generated upward in both bars and one opposes the other. With the pole pitch reduced to one-half its former value the tendency is for current to flow upward in bar 1, downward in bar 7, and so on, as represented, the pitch now being six bars instead of twelve bars. The path open to these currents is the zig-zag route via C, H, J, M, N, P and Q, as indicated by the arrows in Figs. 5 and 5ª. This path is of comparatively high resistance because it has only the cross section of one connector. There is also the other zig-zag path at the top of bars, from 2 to 4 and then to 6, as shown, through which current flows. In Figs. 5 and 5ª these two zig-zag paths combined, however, are of higher resistance than the three direct connectors of Figs. 4 and 4ª. Moreover the zig-zag paths are also open to the currents in Fig. 4, as indicated by arrows therein. Hence the currents have two zig-zag paths and three direct paths, equivalent to five end connectors in Fig. 4, whereas they have only two zig-zag paths equivalent to two connectors in Figs. 5 and 5ª. The result is that the secondary resistance is relatively much higher for the smaller pole pitch and lower speed, represented by Figs. 5 and 5ª than it is for the larger pole pitch and higher speed, represented by Figs. 4 and 4ª. As already stated these conditions are advantageous. If it is desired to increase still further the secondary resistance for starting or for low speeds, the following modifications of my invention, shown in Figs. 6, 7 and 8 may be employed:

In Fig. 6, a portion of the rotor bars and end connectors are represented. The ends of the connectors are reduced in thickness, as shown, so that the portion that joins a group of three adjacent bars together is thinner than the rest of the connector. For example, the end portion J, K, M, of the connector that electrically unites the rotor bars 2, 3 and 4 is shown much thinner than the rest of the connector. The other connectors are made in a similar manner. The result of employing this construction is to increase the secondary resistance for starting or low speeds with small pole pitch, which in this case is represented to be from bar 1 to bar 7, that is six bars. The secondary circuit may be made to have any desired increase in resistance for starting or low speeds by reducing the thickness of the ends of the connectors, such as J, M, or N, P, etc. With this construction the zig-zag paths of the currents corresponding to the small pole represented in Fig. 6, also in Figs. 5 and 5ª has relatively a much higher resistance than the direct paths of the currents with pole pitch nearly equal to the end connector pitch, as in Figs. 4 and 4ª.

In the former case, the secondary current flows from bar 1 to bar 7 which distance equals the low pole pitch, that is six bars, and has to traverse six sections of end connector of reduced thickness, as indicated by the arrows, whereas, with the full pole pitch about equal to the end connector pitch, the secondary current flows directly from bar 1 to bar 13, (the full pitch of twelve bars) through the portion of the connector that has greater thickness and therefore less resistance, the ratio depending upon the relative thickness of the different portions of the connectors. To be sure one-half of the bars, for example, bars 1, 3, etc., are not connected by the thicker portions of the connectors, and the current from them must pass through one section of the thinner part of the connector, as shown in Fig. 6. But the resistance of this one section is only one-sixth of the resistance for the current with the smaller pole pitch. If desired, the connectors may be made with full thickness except the extreme end section. For example, only the part J, K, is thin, the part K, M, being made as thick as the rest of the connector. In this way each bar is connected to a connector of full thickness.

In Fig. 7 another form of end connector is shown which may be designed to give any desired degree of increase in secondary resistance for starting or low speeds. The ends of the connector are reduced in cross section by cutting away some of their depth, as represented at a, b, B, or it may be further cut away, as indicated by dotted lines. Of course the ends of the connectors may at the same time be reduced in thickness, as in Fig. 6, in order to increase the resistance still further. A similar result may be obtained by the use of a small auxiliary connector, such as that illustrated in Fig. 8. In this case, the main end connector could be made of any suitable cross section to give the proper mechanical strength and relatively low electrical resistance. This connector would extend from bar 1 to bar 13 in Fig. 7, and bar A would be connected to bar 1 by the comparatively high resistance auxiliary connector shown in Fig. 8. The same for bars 13 and 14. If so desired, the main connector may extend only from bar 2 to bar 12 and an auxiliary connector may span the three bars A, 1 and 2, also another auxiliary connector for the bars 12, 13 and 14. These auxiliary connectors may have any required resistance by making them of the proper thinness, depth and material.

The particular type of end connectors illustrated in Figs. 4, 4ª, 5, 5ª and 6 are oblique to the rotor bars, being in that respect similar to those set forth in U. S. Patent No. 1,013,753 granted to Gano Dunn. It is not essential, however, to employ this construction in order to practise my invention. Figs. 9 and 10 illustrate the application of my invention by means of end connectors that are at right angles to the rotor bars. In general, however, the arrangement therein shown is similar to that of Figs. 4, 4ª, 5, 5ª and 6 already described. Fig. 3 is a general view of a portion of a rotor having perpendicular end connectors arranged according to my invention. Only part of the end connectors are shown at the right hand end of the rotor.

It is usually desirable to have a prime number of rotor bars with respect to the number of poles. In order to simplify the drawings, however, simple numerical relations have been adopted. By adding or subtracting one bar or some other suitable number of bars, any desired number, either prime or otherwise, may be obtained. In Fig. 11, for example, an additional bar is introduced, and an additional end connector extending from the point marked 30 to the point marked 15 is also introduced.

In order to simplify the drawings and make them readily comparable, in most cases I have illustrated the same number of rotor bars, also the same pole pitch as well as end connector pitch, but my invention may be practised with many different numerical relations. In Fig. 12, for example, the connector extends from the bar A to the bar 16 and connects the four bars A, 1, 2 and 3 at one end to the four bars 13, 14, 15 and 16 at its other end. With this arrangement the increase in resistance of the end connectors indicated in Figs. 6, 7 and 8, may be applied to all three of the sections 33 to 36 or to any one or two of them. It is also a fact in Fig. 12 that the average distance or pitch between the two groups of bars is thirteen instead of twelve. Various other numbers of bars, pole pitch, end connector pitch, grouping of bars, etc., may be employed, if desired.

Figure 14:
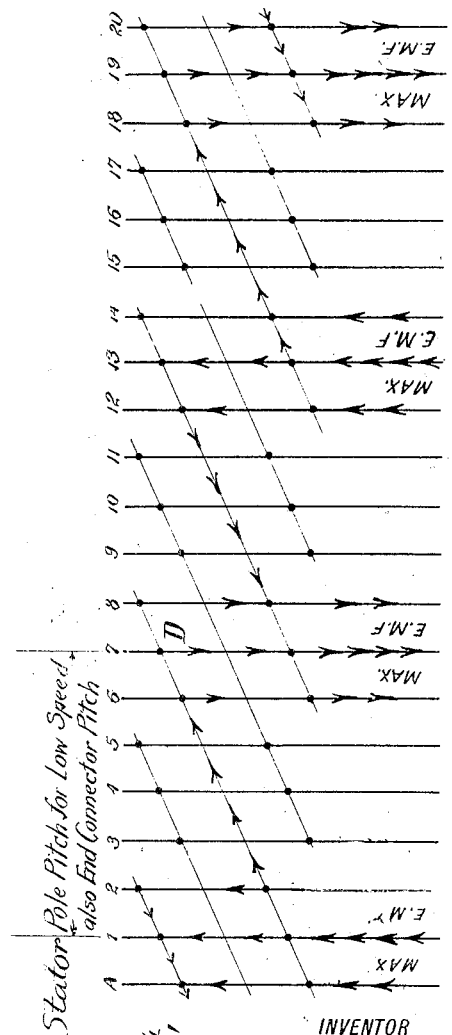

In Fig. 13 is represented a secondary circuit of relatively low resistance adapted to operation of the motor at the higher speeds with the larger pole pitch. In Fig. 14 is shown a secondary circuit of relatively high resistance suitable for a motor that is starting or running at the lower speeds with the smaller pole pitch.

I prefer to make the end connectors alike so that they are interchangeable for the sake of cheapness of construction and repair, but it is obvious that one or more of them may have a different size or shape to suit a particular number or arrangement of bars or for other special reasons.

I have shown and described a variation in pole pitch in the ratio of one to two, that is, a pole pitch for starting and low speeds which is one-half as large as that employed for higher speeds. If desired a still greater ratio of pole pitch may be adopted, for example, one to three or one to four. It is also a fact that intermediate ratios of pole pitch may also be employed. For example, a pole pitch that is three-quarters of the maximum may be used as indicated in Fig. 1.

In this specification I have referred in a generic sense to the rotor which I employ as being of the squirrel cage type. Ordinarily this term is applied to rotors in which the bars are all connected together and short circuited by end rings or similar construction. The drawings and description which set forth my invention show clearly that my form of rotor differs from the ordinary type, because the bars are connected in a particular manner and not simply short circuited. In some cases it may be desirable to make use of my connectors at only one end of the rotor; ordinary end rings or other connections being employed at the other end of the rotor.

In Fig. 2 the rotor bars 5, 6, 7, 8, 9, 10 and 11 are shown separated from the two end connectors by a considerable distance. This is not necessary because a slight separation would be sufficient. In fact it would do no harm if the end connectors should bend outward and touch the bars at high speeds as it would only result in reducing the secondary resistance, which should be low at that time. In this case the bars would serve to prevent the end connectors from bending outward too much by centrifugal force.

I claim:

1. In an induction motor, the combination with the rotor bars of connectors each of which is electrically connected at both ends to a plurality of said bars and spans several bars with which it is not directly connected, one end of each bar being connected to at least two of said connectors and the average distance between the two groups of connected bars being approximately equal to the pole pitch.

2. In an induction motor, the combination with the rotor bars of connectors each of which is electrically connected at both ends to a plurality of said bars and spans several bars with which it is not in contact, one end of each bar being connected to at least two of said connectors and the average distance between the two groups of connected bars being approximately equal to the pole pitch.

3. In an induction motor the combination with a primary element of variable pole pitch of a secondary winding comprising inductors and elements, each of which electrically connects at both ends with a plurality of inductors and spans several inductors with which it does not contact, one end of each bar being connected to at least two of said connectors, the average distance between the two groups of inductors being approximately equal to the larger pole pitch.

4. In an induction motor having a stator of variable pole pitch the combination with the rotor bars of elements each of which electrically connects at both ends with a plurality of said bars and spans several bars with which it is not in direct electrical connection, one end of each bar being connected to at least two of said connectors, the average distance between the two sets of connected bars being approximately equal to the larger pole pitch.

5. In an induction motor, having a stator of variable pole pitch the combination with the rotor bars of elements each of which electrically connects at both ends with a plurality of adjacent bars covering an arc considerably less than the smaller pole pitch, and spans several bars with which it is not in direct electrical connection, one end of each bar being connected to at least two of said connectors, the average distance between the two sets of connected bars being approximately equal to the larger pole pitch.

Signed at Worcester in the county of Worcester and State of Massachusetts, this twentieth day of January, A. D. 1913.

ALLAN W. FORBES.

Witnesses:
 HARRIETTE M. FORBES,
 WILLIAM T. FORBES.